Jan. 20. 1925.
A. E. GREENE
1,523,536
ELECTRICAL CONDENSER
Filed Sept. 4, 1923
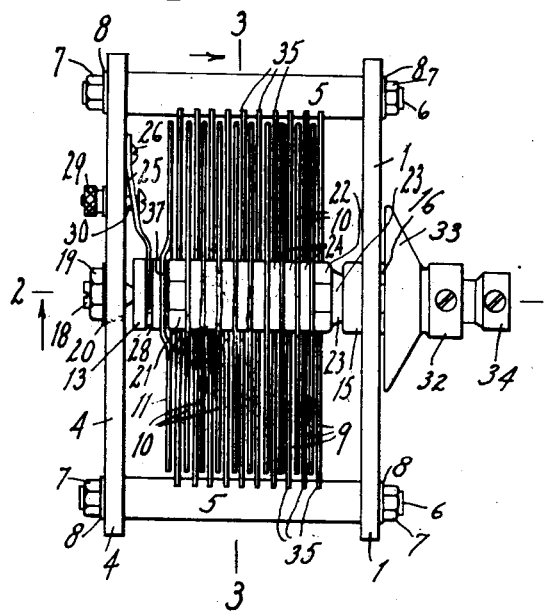
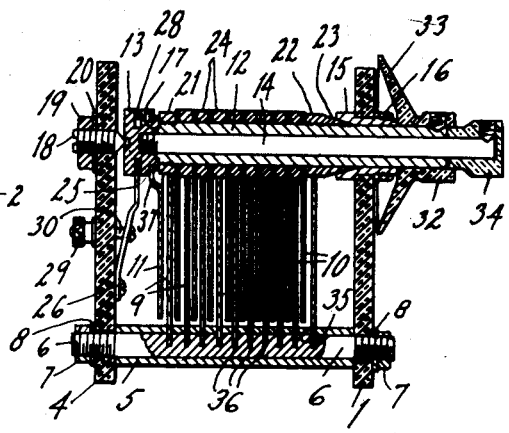
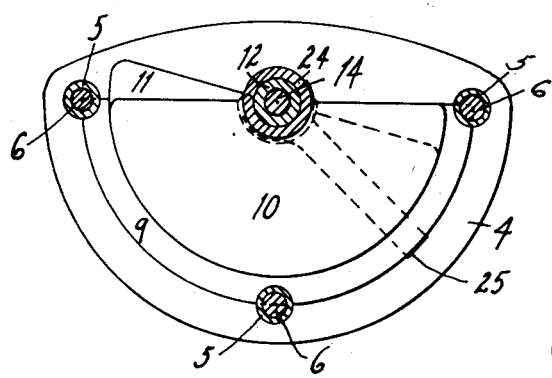
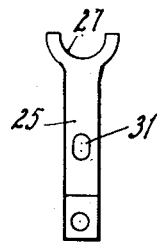
Augustine E. Greene,
INVENTOR.
BY
Frank A. Cutter,
ATTORNEY.

Patented Jan. 20, 1925.

1,523,536

UNITED STATES PATENT OFFICE.

AUGUSTINE E. GREENE, OF WILLIMANTIC, CONNECTICUT.

ELECTRICAL CONDENSER.

Application filed September 4, 1923. Serial No. 660,732.

*To all whom it may concern:*

Be it known that I, AUGUSTINE E. GREENE, a citizen of the United States of America, and a resident of Willimantic, in the county of Windham and State of Connecticut, have invented a new and useful Electrical Condenser, of which the following is a specification.

My invention relates to improvements in electrical condensers, of the rotary, air type for wireless telegraphy and telephony, in which movable or rotor plates are interleaved or interspersed with stationary or stator plates, in order properly to adjust or regulate the capacity of such condensers, and consists essentially of a condenser in which there are certain peculiar means for holding in place the stator plates, improved bearing means for the axial members that carry the rotor plates, and special, adjustable tension means for one of said rotor plates which is capable of being operated independently of the other rotor plates, and vice versa, together with such other parts and members as may be necessary or desirable in order to render the condenser complete and serviceable in every respect, all as hereinafter set forth.

The primary object of my invention is to produce an electrical condenser wherewith a very fine adjustment, to the precise capacity value desired, may be readily obtained, such condenser being comparatively simple in construction, yet strong and durable, and possessing the other necessary and desirable characteristics.

Another object is to provide means, in a condenser of this kind, for securely locking the stationary or stator plates in place and holding them in proper position and to serve as excellent electrical conductors, which means is of a very simple nature and acts on all of the plates at the same time in the process of assembling the parts, whereby such process is greatly facilitated, and the plates are held with a uniform amount of force. These plates are also held in exact parallelism by the aforesaid locking or holding means, as is essential in an electrical condenser.

The movable or rotor plates consist of a set with which the coarser adjustment is obtained, and one plate at least with which the finer adjustment is obtained, and a further object is to provide bearings for the axial supports for said plates, which bearings lend themselves most readily to the adjustment or rotary movement of either said set of plates or said single plate, without disturbing the other, such bearings accurately centering said axial supports, and being capable of adjustment for the purpose of taking up wear. The aforesaid single rotor plate is hereinafter termed the fine-adjustment plate of the instrument.

Still another object is to provide delicately adjustable, resilient means for regulating the amount of bearing force of the hub of the fine-adjustment plate.

Other objects and advantages will appear in the course of the following description.

I attain the objects and secure the advantages of my invention by the mechanism illustrated in the accompanying drawings, in which—

Figure 1 is a top plan of an electrical condenser which embodies a practical form of my invention; Fig. 2, a central, vertical section through said condenser, taken on lines 2—2, looking in the direction of the associated arrow, in Fig. 1; Fig. 3, a vertical section through said condenser, taken on lines 3—3, looking in the direction of the associated arrow, in Fig. 1, and, Fig. 4, a side elevation of the spring by means of which the tension is applied to the fine-adjustment-plate hub.

Similar reference characters designate similar parts throughout the several views.

The frame of my condenser may be said to consist of a front plate or panel 1, a back plate 4, three spacers or sleeves 5 between said plates, and the same number of bolts 6 with nuts 7 and washers 8 thereon. The front and back plates 1 and 4 are made of insulating material. The bolts 6 extend through the sleeves 5 and the plates 1 and 4, and the nuts 7 and washers 8 are applied to said bolts outside of said plates. Axial supporting members, for the rotor plates presently to be described, have their bearings or are supported in the transverse, vertical, central plane of the plates 1 and 4 near the top of said plates, at points which define what may be termed the axial center of the frame, and one of the bolts 6 is located in said plane near the bottom of said plates, while the other two bolts 6 are located in a horizontal plane common to themselves and to said axial center. The bolts 6 are in a semicircle struck from the aforesaid axial center.

The condenser comprises a stator consisting of a series, set, or plurality of fixed plates 9, and a rotor consisting of a series, set, or plurality of movable plates 10 and a single movable plate 11 (the fine-adjustment plate). The fixed and movable plates are semicircular, and the two types of plates are interleaved with each other. The foremost plate 9 is in front of the foremost plate 10, and the plate 11 is behind the rearmost plate 9. In the present example, there are ten stator plates and the same number of rotor plates, or twenty plates in all, but this number may be varied to a considerable extent. There might be more than one fine-adjustment plate.

In each sleeve 5 is a series of slots 35 to receive edge portions of the stator plates 9, and in each bolt 6 is a series of slots 36 to receive such edge portions after they have passed through said first-named slots, as best shown in Fig. 2. The slots 35 and 36, in each case, are equidistant apart and separated to the extent required for the interspersing without contact of the rotor plates 10 with the stator plates 9, after the latter have been secured in place in the manner described below.

The plates 9, with their straight edges uppermost, are introduced between the two upper sleeves 5 and moved downwardly to have their bottom edges and their corners inserted in the slots 35 in the three sleeves 5 and in the slots 36 in the three bolts 6, said bolts being so disposed as to locate their slots in proper position to receive the edges portions of said plates. Then the nuts 7 are tightened on the bolts 6 in such a manner as to draw or force the edge portions of the plates 9 which are in the slots 36 tightly against the edges on one side of the slots 35. A lateral or shearing force or pressure is thus applied to the portions of the plates 9 that are in the slots, and said plates are so securely locked in place that there is no liability of any of the plates becoming loose. In assembling these parts and members, the nuts 7 on the bolts 6 at one end are first set up to the extent necessary to bind the plates 9 in place in the slots 35 and 36, and at the same time force the contiguous frame plate (1 or 4) tightly against said sleeves, and then the nuts 7 on said bolts at the other end are set up to force the other frame plate tightly against said sleeves. A rigid frame results from securing the plates 1 and 4 to the sleeves 5, and binding said plates to the ends of said sleeves, by means of the bolts 6 and the nuts 7.

The rotor plates 10 are mounted on and secured to a hollow shaft 12, and the rotor plate 11 is mounted on and secured to a hub 13 which in turn is rigidly attached to the rear end of a spindle or arbor 14, said hub being, in this case, screwed onto said arbor. That part of the plate 11 which is secured to the hub 13 is offset rearwardly, as represented at 37. The offset 37 provides means for locating the plate 11 in proper relation to the rearmost plate 9 in a construction wherein, without such offset, it would be necessary either to locate the rearmost plate 9 farther back, or else to provide an additional plate 9 and an additional plate 10.

The axial center of the instrument, of which mention has been made, is defined by openings in the front and back 1 and 4, and in such front-plate opening is located a flanged bearing member or bushing 15, said bushing being held in place by means of its flange behind and a nut 16 screwed onto the bushing in front. The bore through the bushing 15 at the inner end is tapered to form a flaring mouth which has an included angle of approximately 45°. The hollow shaft 12 is journaled in or passes through the bearing member 15. The arbor 14 is rotatably received in the hollow shaft 12 and extends beyond both ends of said shaft. The hub 13 is behind the hollow shaft 12, and in the front face of said hub is a tapered seat the included angle of which is approximately 120°. The rear end of the hollow shaft 12 is tapered to form a bearing that corresponds with the seat in the hub 13 and is received therein or thereon, such bearing being indicated by the numeral 17. A supporting and centering screw 18 for the hub 13 is tapped into the axial central opening in the back plate 4, and is held against accidental displacement by means of a nut 19 and a washer 20 on that portion of said screw which extends behind said plate. The inner terminal of the screw 18 is tapered and received in a recess in the center of the backside of the hub 13. The hollow shaft 12 is screw-threaded adjacent to its rear end to receive a nut 21, and is also screw-threaded back of the bearing member 15 to receive a nut 22. The nut 22 has a forwardly-extending part or bearing 23 which is tapered to correspond with the taper in the bearing member 15 and is received in said bearing member. The hub portions in the centers of the straight edges of the rotor plates 10 receive the hollow shaft 12, and such portions are separated or spaced apart equidistant from each other by means of spacers 24 mounted on said shaft, there being one of such spacers between each pair of adjacent plates. The spacers 24 are of such proportions that they locate the rotor plates 10 between the stator plates 9 without contacting with the latter. The hubs of the plates 10 and the spacers 24 are forcibly held in contact with each other on the hollow shaft 12 by means of the nuts 21 and 22, when said first-named nut is screwed tightly against the rearmost hub, consequently all of the plates 10 have rotary movement with said shaft.

In assembling the parts and members just described, the nut 22 is located and adjusted on the hollow shaft 12 in proper position to afford a suitable end thrust bearing in the mouth of the bearing member 15, the nut 21 is tightened against the parts intervening between the two nuts, and the screw 18 is adjusted to center and support the hub 13 and the axial members connected therewith. After the nuts 22 and 21 are set on the hollow shaft 12, further adjustment of said nuts on said shaft is not ordinarily required, but upon occasion and in case of wear said nuts may be advanced, in the one case, and the nut 19 may be loosened, the screw 18 turned to advance the same, and said nut retightened, in the other case.

A yielding or resilient tension is provided to retain the hub 13 in engagement with the tapered bearing 17, as an auxiliary to the screw 18 which has such a tendency, and to this end a spring 25 is provided. The spring 25 has one terminal secured at 26 to the back plate 4 on the inside thereof, and extends into engagement with the hub 13. The terminal of the spring 25 opposite to that where said spring is attached to the plate 4 is forked, as best shown at 27 in Fig. 4, and such terminal is received in an annular groove 28 in the hub 13. Provision is thus made for the desired engagement between the spring 25 and the hub 13 without preventing the rotation of said hub. The spring 25 has a constant tendency to urge the hub 13 forwardly into contact with the end-thrust bearing 17, but is not strong enough to have any appreciable effect on the hollow shaft 12.

For the purpose of regulating the amount of force which the spring 25 is permitted to exert on the hub 13, a thumb-nut 29 and a screw 30 are provided. The screw 30 passes through a slot 31 in the spring 25, and outwardly through an opening in the back plate 4 to receive on the outer terminal of said screw the thumb-nut 29. By manipulating the parts to draw the screw 30 rearwardly through the back plate 4, said spring is swung nearer to said plate and the force or pressure exerted thereby on the hub 13 correspondingly decreased, while, by manipulating the parts to move said screw inwardly or forwardly, said spring is permitted to swing farther away from said plate and exert a greater amount of pressure on said hub.

Secured to the forward, protruding terminal of the hollow shaft 12 is a knob 32 which is provided with a dial 33, and secured to the forward, protruding terminal of the arbor 14 is a knob 34, said knobs and dial being of usual and well-known construction.

Owing to the fact that the end-thrust, tapered bearing parts for the hollow shaft 12 are so much more acute than are the end-thrust, tapered bearing parts for the hub 13, said shaft can be rotated without rotating the hub 13 and the arbor 14, on the one hand, and said arbor and hub can be rotated without rotating said shaft, on the other hand. In the first case the frictional resistance between the hollow shaft 12 and the arbor 14 and the end-thrust, bearing parts between said shaft and the hub 13 is insufficient to cause said arbor and hub to be carried with said hollow shaft, and, in the second case, the frictional resistance between the parts is insufficient to cause said arbor and hub to carry with them said shaft, but this would not be so were it not for the presence of the more sharply tapered, end-thrust, bearing parts between the nut 22 and the bearing member 15. The resistance offered by the bearing parts of the nut 22 and the bearing member 15 is sufficient to hold the hollow shaft 12 against rotation when the arbor 14 is rotated, and the frictional resistance between the bearing parts of the hollow shaft 12 and the hub 13 is insufficient to cause said hub and arbor to be carried with said hollow shaft when the latter is rotated.

The tapered bearing parts, in addition to performing the offices or serving the purposes above described, also afford accurate and stable centering means for the axial members of the rotor plates.

In practice, first the knob 32 is grasped and partially rotated, and with it the hollow shaft 12 and the rotor plates 10, the amount of the rotation being such as is required to obtain roughly the desired capacity value, and then the knob 34 is grasped and partially rotated, and with it the arbor 14, the hub 13, and the rotor, fine-adjustment plate 11, the amount of the last rotation being such as is necessary to obtain the exact capacity value desired.

In Fig. 3, the rotor, fine-adjustment plate 11 is shown with a part exposed above the rotor plates 10, which latter are assumed to be in initial position. This position of the fine-adjustment plate would not ordinarily obtain, if the condenser were in actual use, unless the plates 10 were actuated out of normal position, said fine-adjustment plate being shown out of initial position for the sake of clearness in illustrating the different plates in Fig. 3.

More or less change in the shape, size, construction, and arrangement, of some or all of the parts of this condenser, in addition to those hereinbefore specifically pointed out, may be made without departing from the spirit of my invention or exceeding the scope of what is claimed.

What I claim as my invention, and desire to secure by Letters Patent, is—

1. In an electrical condenser, a plurality of stator plates, and means to exert a shearing pressure on edge portions of said plates, whereby the same are held stationary in spaced relationship.

2. In an electrical condenser, supporting members, a plurality of stator plates, and means connected with said supporting members and adapted to receive and exert a shearing pressure on edge portions of said stator plates, whereby said plates are held stationary in spaced relationship.

3. In an electrical condenser, supporting members, a plurality of stator plates, slotted tubular members between said supporting members, slotted members within said tubular member, and means to secure the parts together and exert a shearing pressure on edge portions of said plates, whereby the latter are held stationary in spaced relationship.

4. In an electrical condenser, front and back supporting members, a plurality of stator plates, bolts extending through said members and slotted to receive edge portions of said plates, sleeves on said bolts between said members and also slotted to receive such edge portions, and nuts on said bolts, said sleeves serving as spacers for said supporting members, and adapted to enable said bolts to exert a shearing pressure on such edge portions.

5. The combination, in an electrical condenser, with a plurality of stator plates, of a plurality of rotor plates including a fine-adjustment plate, axial members for said rotor plates, and tapered end-thrust bearings for said axial members, the included angle of one of said bearings being greater than the included angle of the other of said bearings.

6. The combination, in an electrical condenser, with a plurality of stator plates, of a plurality of rotor plates including a fine-adjustment plate, axial members for said rotor plates, an acutely tapered end-thrust bearing for the axial member which directly supports said rotor plates exclusive of said fine-adjustment plate, and an obtusely tapered end-thrust bearing for the axial member which directly supports said fine-adjustment plate.

7. The combination, in an electrical condenser, with a plurality of stator plates, of a plurality of rotor plates including a fine-adjustment plate, axial members for said rotor plates, an acutely tapered end-thrust bearing for the axial member which directly supports said rotor plates exclusive of said fine-adjustment plate, an obtusely tapered end-thrust bearing for the axial member which directly supports said fine-adjustment plate, and means to regulate the amount of pressure between said last-named axial member and its end-thrust bearing.

8. The combination, in an electrical condenser, with a plurality of stator plates, of a plurality of rotor plates including a fine-adjustment plate, axial members for said rotor plates, an acutely tapered end-thrust bearing for the axial member which directly supports said rotor plates exclusive of said fine-adjustment plate, and an obtusely tapered end-thrust bearing for the axial member which directly supports said fine-adjustment plate, and resilient means to regulate the amount of pressure between said last-named axial member and its end-thrust bearing.

9. The combination, in an electrical condenser, with a suitable frame provided with a bearing member having a tapered mouth, and a plurality of stator plates in said frame, of a hollow shaft provided with a tapered bearing which is received in said mouth, and having a tapered bearing at the inner end, a plurality of rotor plates carried by said shaft, an arbor in said shaft provided with a hub which has a tapered seat to receive said last-named bearing, the included angle of said end bearing being greater than the included angle of said first-named bearing, and a rotor fine-adjustment plate carried by said hub.

10. The combination, in an electrical condenser, with a suitable frame provided with a bearing member having a tapered mouth, and a plurality of stator plates in said frame, of a hollow shaft provided with a tapered bearing which is received in said mouth, and having a tapered bearing at the inner end, a plurality of rotor plates carried by said shaft, an arbor in said shaft provided with a hub which has a tapered seat to receive said last-named bearing, the included angle of said end bearing being greater than the included angle of said first-named bearing, a rotor fine-adjustment plate carried by said hub, and centering means carried by said frame for said hub.

11. The combination, in an electrical condenser, with a suitable frame provided with a bearing member having a tapered mouth, and a plurality of stator plates in said frame, of a hollow shaft provided with an adjustable tapered bearing which is received in said mouth, and having a tapered bearing at the inner end, a plurality of rotor plates carried by said shaft, an arbor in said shaft provided with a hub which has a tapered seat to receive said last-named bearing, the included angle of said end bearing greater than the included angle of said first-named bearing, and a rotor fine-adjustment plate carried by said hub.

12. The combination, in an electrical condenser, with a suitable frame provided with a bearing member having a flaring mouth, and a plurality of stator plates in said frame, of a hollow shaft provided with a tapered bearing which is received in said mouth, and having a tapered bearing at the inner end, a plurality of rotor plates carried by said shaft, an arbor in said shaft provided with a hub which has a tapered seat to receive said last-named bearing, the included angle of said end bearing being greater than the included angle of said first-named bearing, a rotor fine-adjustment plate carried by said hub, and a spring attached to said frame and in engagement with said hub, said spring being adapted to force said hub into contact with its bearing.

13. The combination, in an electrical condenser, with a suitable frame provided with a bearing member having a tapered mouth, and a plurality of stator plates in said frame, of a hollow shaft provided with a tapered bearing which is recived in said mouth, and having a tapered bearing at the inner end, a plurality of rotor plates carried by said shaft, an arbor in said shaft provided with a hub which has a tapered seat to receive said last-named bearing, the included angle of said end bearing being greater than the included angle of said first-named bearing, a rotor fine-adjustment plate carried by said hub, a spring attached to said frame and in engagement with said hub, said spring being adapted to force said hub into contact with its bearing, and regulating means for said spring.

14. The combination, in an electrical condenser, with a suitable frame provided with a bearing member having a flaring mouth, and a plurality of rotor plates in said frame, of a hollow shaft provided with a tapered bearing which is received in said mouth, and having a tapered bearing at the inner end, a plurality of rotor plates carried by said shaft, an arbor in said shaft, a hub secured to said arbor and having a tapered seat to receive said end bearing, the included angle of said last-named bearing being greater than that of said first-named bearing, and a rotor fine-adjustment plate carried by said hub, said last-named plate being offset to locate the same beneath said shaft.

15. The combination, in an electrical condenser, with a suitable frame provided with a bearing member having a flaring mouth, and a plurality of stator plates in said frame, of a hollow shaft having a tapered bearing at the inner end, a nut on said shaft having a tapered bearing which is received in said mouth, a plurality of rotor plates carried by said shaft, an arbor in said shaft, a hub secured to said arbor and having a tapered seat to receive said end bearing, the included angle of said end bearing being greater than that of said second-named bearing, and a rotor fine-adjustment plate carried by said hub.

16. The combination, in an electrical condenser, with a suitable frame provided with a bearing member having a flaring mouth, and a plurality of stator plates in said frame, of a hollow shaft having at the inner end a tapered bearing, nuts on said shaft, one of said nuts having a tapered bearing which is received in said mouth, pluralities of rotor plates and spacers on said shaft between said nuts, an arbor in said shaft, a hub secured to said arbor and having a tapered seat to receive said end bearing, the included angle of said end bearing being greater than that of said second-named bearing, and a rotor fine-adjustment plate carried by said hub.

17. The combination, in an electrical condenser, with a suitable frame provided with a bearing member having a flaring mouth, and a plurality of stator plates in said frame, of a hollow shaft provided with a tapered bearing which is received in said mouth, and having a tapered bearing at the inner end, the included angle of said first-named bearing being less than that of said last-named bearing, a plurality of rotor plates carried by said shaft, an arbor in said shaft, a hub secured to said arbor and having a tapered seat to receive said end bearing, a rotor fine-adjustment plate carried by said hub, and a centering member in said frame for said hub.

18. The combination, in an electrical condenser, with a suitable frame provided with a bearing member having a tapered mouth, and a plurality of stator plates in said frame, of a hollow shaft provided with a tapered bearing which is received in said mouth, and having a tapered bearing at the inner end, the included angle of said first-named bearing being less than that of said second-named bearing, a plurality of rotor plates carried by said shaft, an arbor in said shaft, a hub secured to said arbor and having a tapered seat to receive said end bearing, a rotor fine-adjustment plate carried by said hub, and a screw tapped into the back side of said frame and engaging said hub in the rear.

19. The combination, in an electrical condenser, with a suitable frame provided with a bearing member having a flaring mouth, and a plurality of stator plates in said frame, of a hollow shaft provided with a member having a tapered bearing which is received in said mouth, and having a tapered bearing at the inner end, the included angle of said last-named bearing being greater than that of said first-named bearing, a plurality of rotor plates carried by said shaft, an arbor in said shaft, a hub on said arbor and having a tapered seat to receive said second-named bearing, a rotor fine-adjustment plate carried by said hub, centering means carried by said frame for said hub.

and a spring having one terminal attached to said frame and the other terminal in engagement with said hub, and adapted to actuate said hub toward its bearing.

20. The combination, in an electrical condenser, with a suitable frame provided with a bearing member having a tapered mouth, and a plurality of stator plates in said frame, of a hollow shaft having a tapered bearing which is received in said mouth, and also having a tapered bearing at the inner end, the included angle of said first-named bearing being less than that of said last-named bearing, a plurality of rotor plates carried by said shaft, an arbor in said shaft, a hub secured to said arbor and having a tapered seat to receive said second-named bearing, centering means for said hub behind the same, a rotor fine-adjustment plate carried by said hub, a spring having one terminal attached to said frame and the other terminal in engagement with said hub, and adapted to actuate said hub against its bearing, a screw passing through said spring outwardly through the back side of said frame, and a thumb-nut on said screw, whereby may be regulated the force exerted by said spring on said hub.

AUGUSTINE E. GREENE.

Witnesses:
M. R. LUKES,
C. C. WEST.